INVENTORS
PIERRE BOUTHORS,
ANDRE COLINET,
By Stevens, Davis, Miller & Mosher
ATTORNEYS

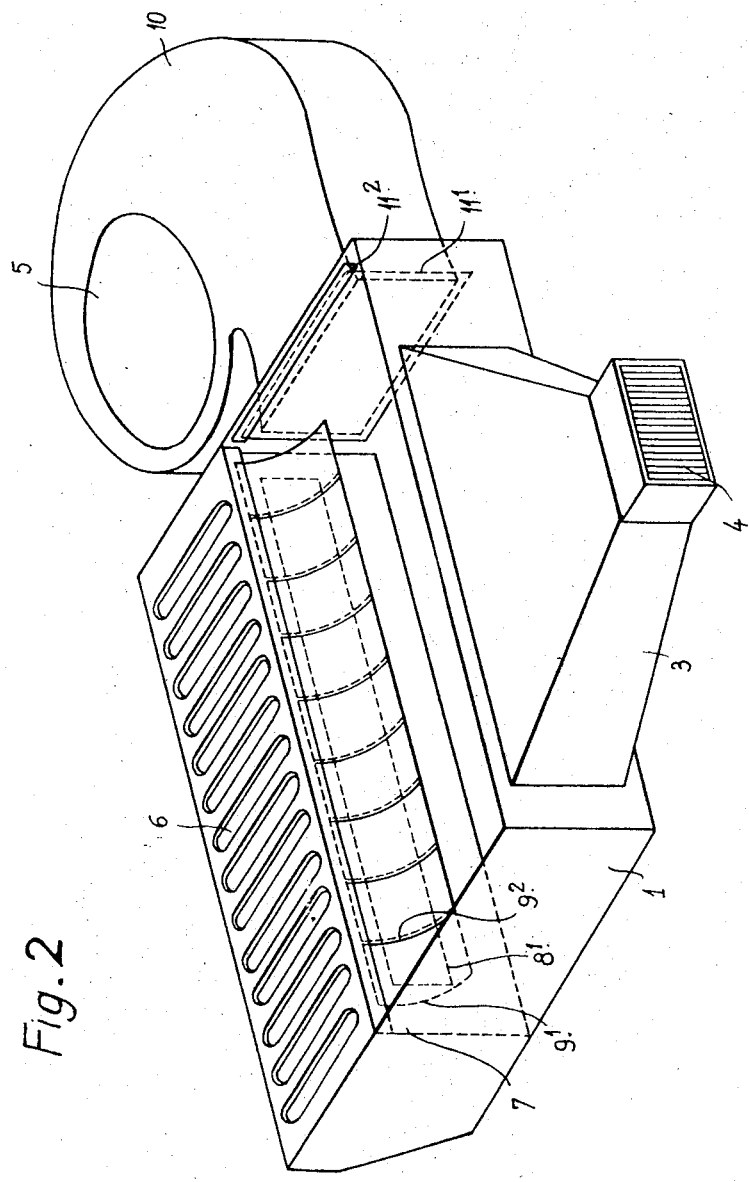

United States Patent Office 3,448,674
Patented June 10, 1969

3,448,674
AIR DISTRIBUTOR BOXES FOR AIR-CONDITIONING SYSTEMS OF VEHICLES
Pierre Bouthors and Andre Colinet, Billancourt, France, assignors to Regie National des Usines Renault and Societe Industrielle et Commercial des Automobiles Peugeot, Billancourt and Paris, France
Filed Oct. 4, 1967, Ser. No. 672,918
Claims priority, application France, Oct. 25, 1966, 81,443; Dec. 9, 1966, 86,911
Int. Cl. F24f 7/00, 13/02, 13/06
U.S. Cl. 98—2    2 Claims

ABSTRACT OF THE DISCLOSURE

An air distributor box for automotive air conditioning systems and having a central chamber, a fan for force feeding air to the chamber when the vehicle is stopped or operating at low speeds and an air inlet chamber to receive dynamic air at intermediate and high vehicle speeds and pass it to the chamber. Normally closed flexible valve members between the chamber and both the fan and the air inlet permit the proper supply of air to the chamber.

---

Figure 1:
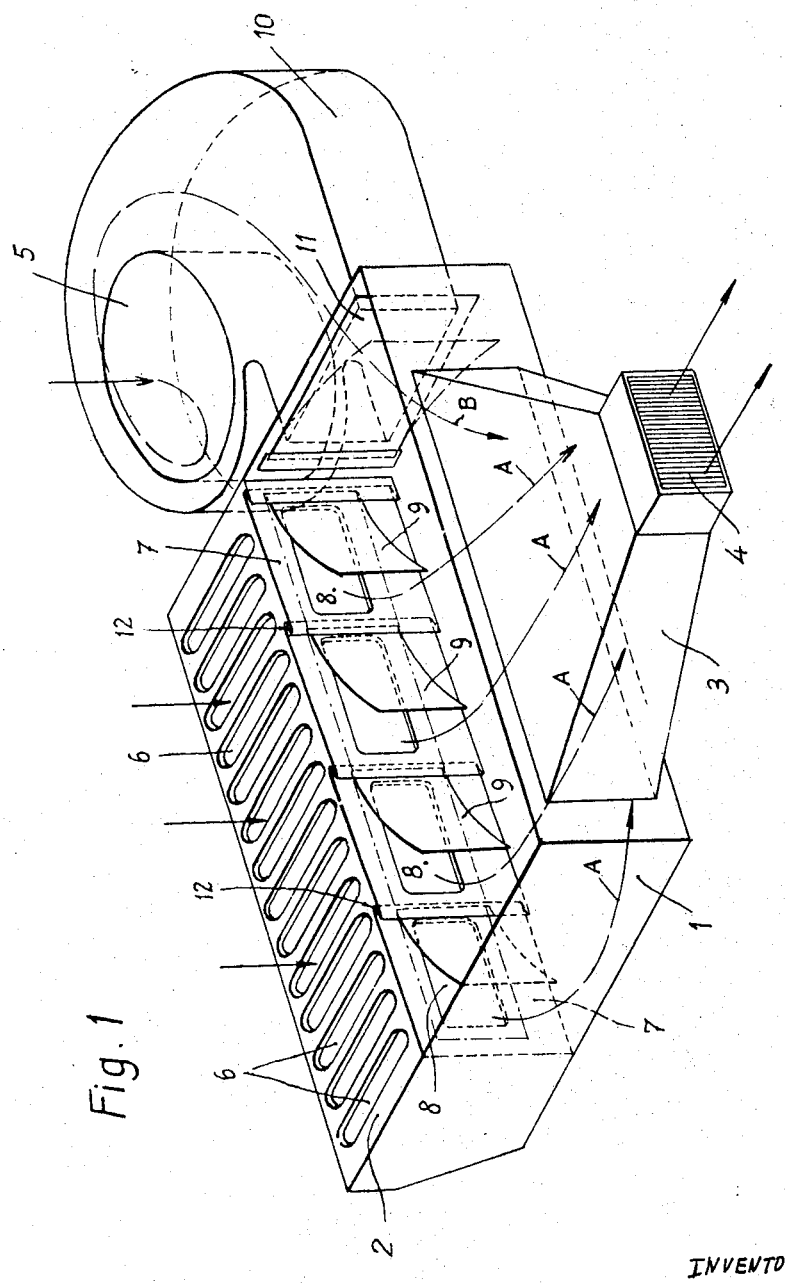

The present invention relates generally to air-conditioning systems of automotive vehicles and has specific reference to a box-type air distributor therefor.

The distributor box according to this invention is adapted to be mounted on the frame or body of the vehicle at a location where the dynamic air pressure acting upon the running vehicle can be exerted freely. The distributor box comprises essentially a central chamber, a turbine or fan having a case leading directly into said chamber and adapted when the vehicle is still or driven at low speeds to force air into said chamber, and an air inlet chamber disposed at one end of said central chamber and adapted at intermediate and high vehicle speeds to receive dynamic air directly from the atmosphere, the opposite end of said central chamber being connected to the heating radiator through which cool or hot air is directed to the interior of the vehicle. The turbine or fan and the dynamic air inlet chamber are provided with flexible louvres or valve members permitting a proper supply of dynamic or forced air into said central chamber. This invention is also concerned with various constructional details and alternate forms of embodiment which will be described hereinafter with reference to the attached drawings showing diagrammatically by way of example two different forms of embodiment of the air distributor box according to this invention. In the drawings:

FIGURE 1 is a diagrammatic perspective and phantom view of a first form of embodiment of the air distributor box of this invention, and FIGURE 2 is a view similar to FIGURE 1 but showing a modified form of embodiment of the box.

Referring to the drawings the distributor box 1 comprises at one end a compartment 2 adapted to receive directly dynamic air produced by the running vehicle, and at the opposite end a suitably shaped compartment 3 connected to the heating radiator 4. Mounted on one side of the box 1 is a turbine or fan 5 adapted to force outside or fresh air into the box 1, this device being operated at low vehicle speeds or when the vehicle is at rest.

The dynamic air compartment 2 comprises air inlets 6 in the form of a grid or the like, and its wall facing the compartment 3 consists of a closing partition 7 formed with relatively large apertures 8 through which the air flowing through the inlets 6 penetrates into the box 1. These apertures 8 are provided with normally closed flexible louvres or valve members 9 adapted to be opened by the pressure of the dynamic air entering the compartment 2.

The turbine or fan casing 10 connected to one of the side walls of the box 1 is provided at the corresponding aperture with another flexible, normally closed louvre or valve member 11 adapted to be opened by the pressure generated by the turbine or fan when the latter is switched on.

According to a preferred form of embodiment of the air distributor box illustrated by way of example the partition 7 is detachable and the flexible louvres or valves 9 associated with the apertures 8 are mounted on this partition 7 by having one of their edges clamped in pressed folds 12 formed in said partition.

The distributor box described hereinabove operates as follows:

At low driving speeds, or when the vehicle is still, the turbine 5 is switched on and air is thus forced along the path shown by the arrow B towards the air-conditioning system, the flexible louvres or valve members 9 being urged by the air pressure against the relevant partition 7. No pressure loss can take place.

At higher vehicle speeds the dynamic air entering the inlets 6 opens the louvres or valve members 9 and follows the path shown by the arrows A.

If necessary, the turbine may be switched on to complete the action produced by the dynamic air.

Of course, hot air or cool air may be blown through the radiator according as the latter is connected or not, respectively, with the engine cooling system of the vehicle.

Preferably, the valves 9 consist simply of sheets of relatively flexible material having a long useful life and insensitive to temperature variations; if desired, a polyethylene terephthalate material may be used to this end.

FIGURE 2 illustrates a modified form of embodiment of the air distributor box of this invention, wherein the flexible louvres or valve members 9 on the one hand are secured by their upper horizontal edges and on the other hand overlap one another with one of their vertical edges.

In this case the inner partition 7 closing the dynamic air inlet compartment 2 comprises a single aperture $8_1$ provided with a suitable number of flexible louvres or valve members $9_1$ overlapping one another with one of their vertical edges as at $9_2$, these louvres or valve members being secured by their upper horizontal edge to the partition 7. These lauvres or valve members overlap one another in such a manner that when the turbine is switched on the air pressure thus generated tends to close them by causing them to bear against one another. If desired, these lauvres or valve members may be secured by clamping their upper edges in a horizontal pressed fold of partition 7, or by any other suitable arrangement.

The flexible valve member $11_1$ associated with the lateral wall of box 1 to which the turbine casing 10 is secured may also be hingedly mounted along its upper edge, a butt-strap $11_2$ being used to this end.

Of course, the single aperture $8_1$ in partition 7 may be replaced by a plurality of apertures as in the example shown in FIGURE 1.

We claim:

1. An air distributor box for air-conditioning systems of vehicles comprising a central chamber, a fan adapted to force air into said chamber when the vehicle is at rest and driven at low speeds, a compartment at one end of said chamber adapted to receive dynamic air at intermediate and high vehicle speeds, a heating radiator connected to the opposite end of said chamber and through which conditioned air is directed to the interior of the vehicle, normally closed flexible valve members between both said fan and said dynamic air receiving compartment and said chamber to permit passage of air into said chamber.

2. An air distributor box according to claim 1 in which said dynamic air receiving compartment comprises a detachable partition formed with at least one aperture for communicating with said central chamber, each said at least one aperture being provided with said flexible valve member secured to said partition by an edge clamped in pressed folds formed in said partition, said valve members overlapping one another with one of their vertical edges.

References Cited

UNITED STATES PATENTS

| | | | |
|---|---|---|---|
| 3,289,938 | 12/1966 | Castelet | 98—2 |
| 3,327,603 | 6/1967 | Castelet | 98—2 |
| 3,329,078 | 7/1967 | Castelet | 98—2 |
| 3,387,549 | 6/1968 | Castelet | 98—2 |

MEYER PERLIN, *Primary Examiner.*